Dec. 9, 1930.  A. W. REYNOLDS  1,784,613
SPRING TOOTH FOR HARROWS AND THE LIKE
Filed July 17, 1928    4 Sheets-Sheet 4

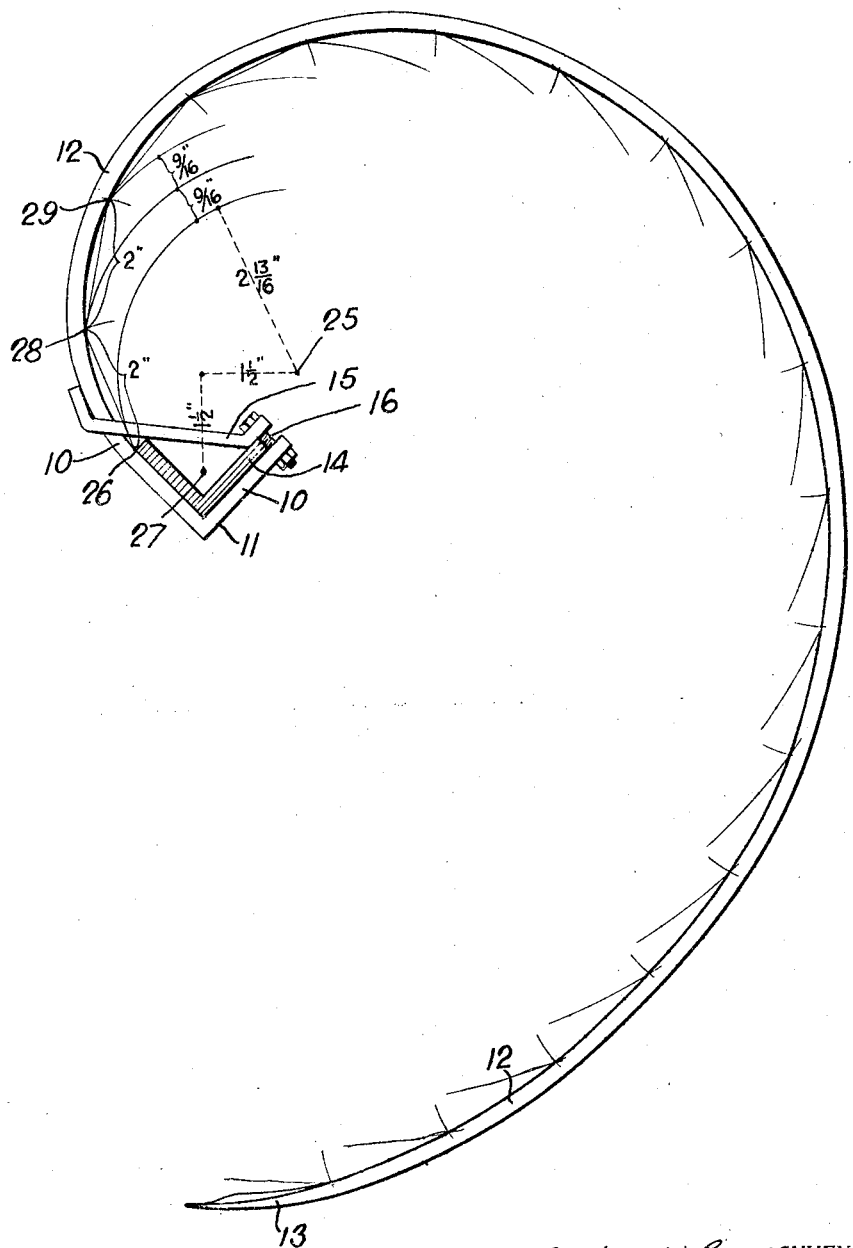

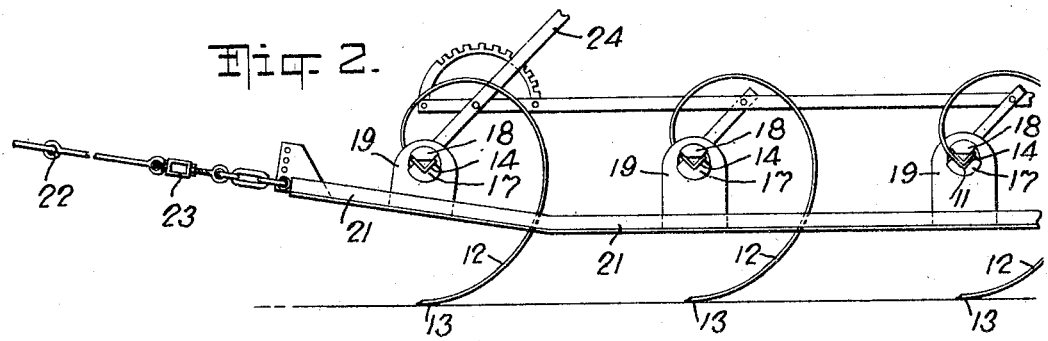
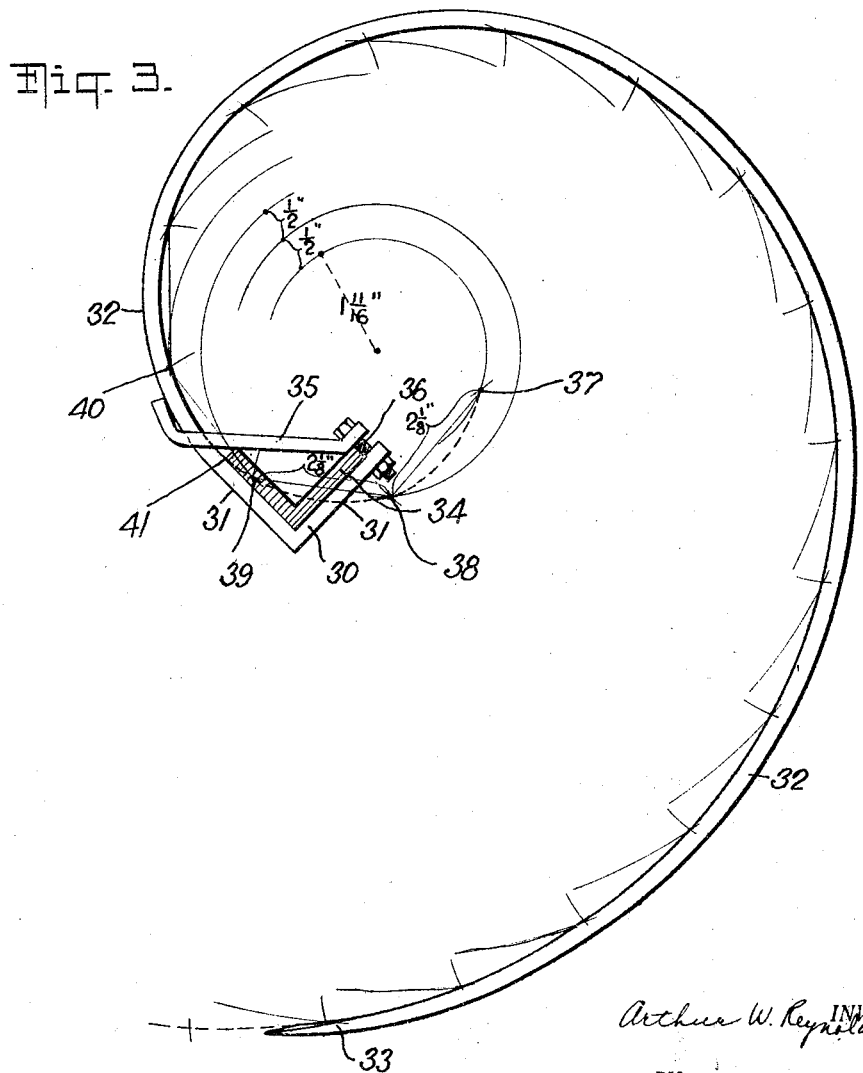

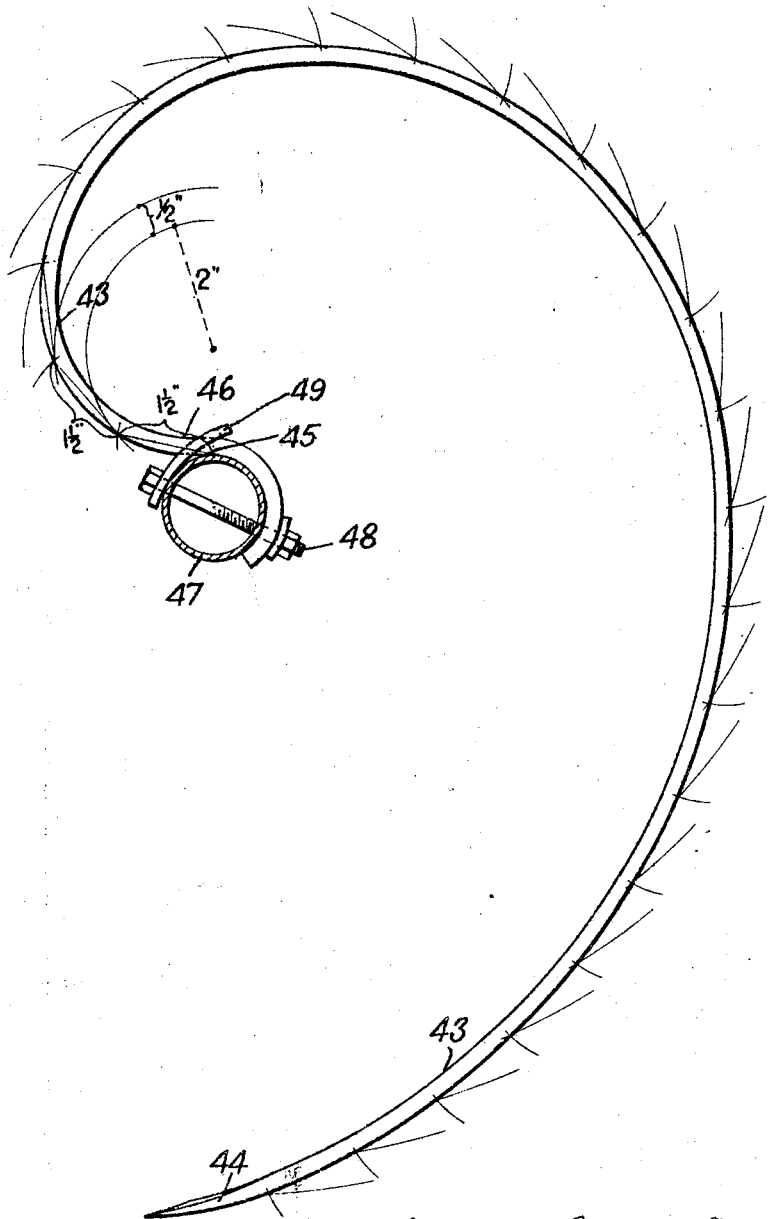

Patented Dec. 9, 1930

1,784,613

UNITED STATES PATENT OFFICE

ARTHUR W. REYNOLDS, OF LEONARDSVILLE, NEW YORK, ASSIGNOR TO THE BABCOCK MANUFACTURING COMPANY, OF LEONARDSVILLE, NEW YORK, A CORPORATION OF NEW YORK

SPRING TOOTH FOR HARROWS AND THE LIKE

Application filed July 17, 1928. Serial No. 293,361.

This invention relates to spring teeth for harrows and similar agricultural implements.

An object of the invention is to provide a spring tooth which has improved strength and resiliency.

Another object is to provide a spring tooth which is economical to manufacture and which will efficiently accomplish the purposes for which it is intended.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawings, in which:

Figure 1 is an elevation (on a reduced scale) of a spring tooth embodying the invention, with the manner of plotting the curve to which the body portion of the tooth conforms indicated thereon, and one form of tooth-mounting means shown partly in section;

Fig. 2 is a side view of a harrow showing one manner of utilizing teeth embodying the invention;

Fig. 3 is an elevation of a tooth embodying the invention which has a shape different from the shape of the tooth of Fig. 1, and shows the manner of plotting the curve to which the body portion of the tooth conforms, and shows partly in section, the mounting means for the tooth;

Figure 5:
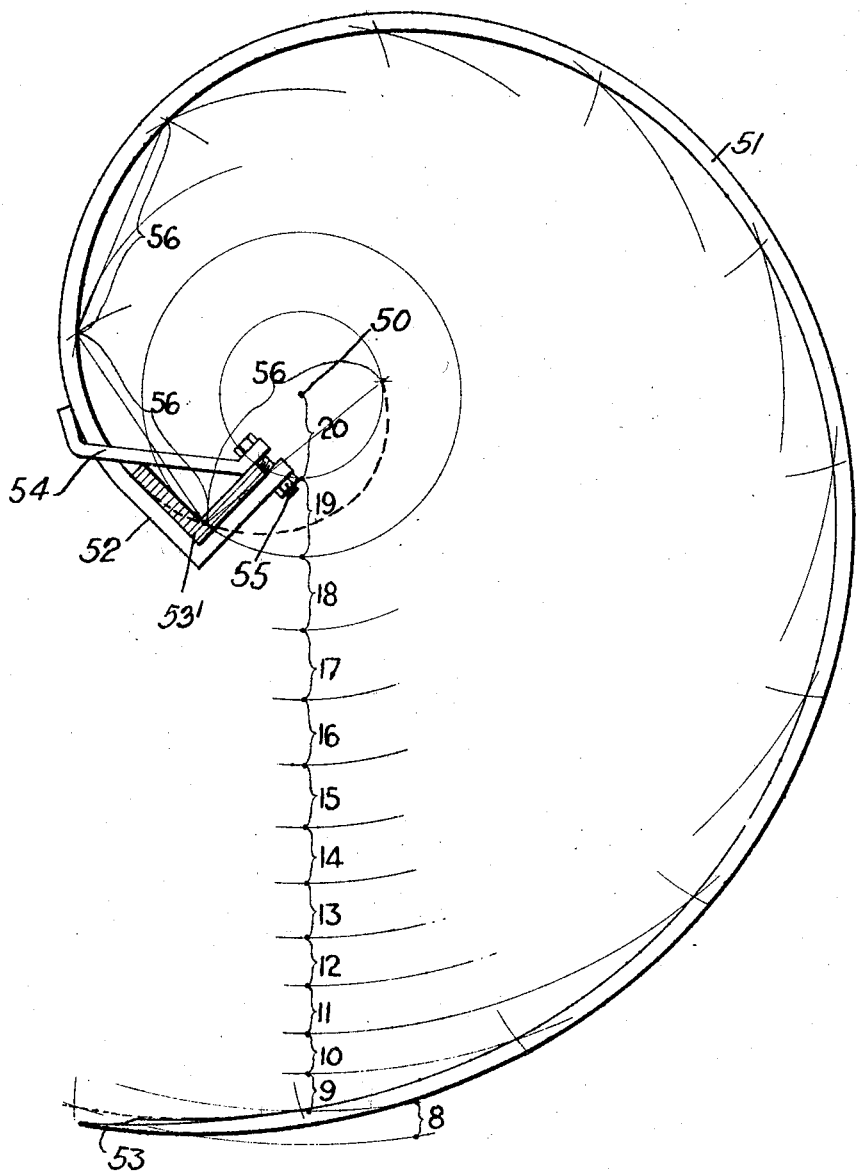

Fig. 4 is an elevation of a tooth embodying the invention which has a shape different from the shapes of the teeth exemplified in Figs. 1 and 2, and which is mounted in a different manner; and shows the manner of plotting the curve to which the body of the tooth conforms, and a different type of tooth-mounting means; and Fig. 5 is an elevation of a tooth the body portion of which conforms to a curve plotted in still another manner.

It is, of course, desirable that a harrow tooth be so constructed that it will be neither broken nor permanently sprung out of shape by the stresses to which it is subjected in use. It is also desirable, in many cases, that the proportion between the length of the tooth and the distance between the heel and the point thereof be such as to give, among other results, the maximum clearance of the ground by the tooth-carrying bar consistent with the desired strength of the tooth. The tooth should also have such resiliency as will permit the point to act properly on the ground when in use.

While the spring teeth at present used in harrows, cultivators, weeders, and similar agricultural implements (which implements will be referred to generally hereinafter by the term "harrows and the like") are made in a wide variety of shapes, and while most of these teeth perform satisfactory service under favorable conditions, many difficulties have been experienced in the use of such teeth by reason of the inability of known teeth to withstand the extraordinary stresses to which such teeth are from time to time subjected when in use, particularly when the harrow or other implement is used in ground containing a large number of roots, rocks or other obstructions, and when used for deep work. In an attempt to overcome these difficulties, certain manufacturers have resorted to the use of alloy steels for the construction of harrow teeth. The use of such steels has reduced the percentage of breaking to a certain extent; but has, of course, materially increased the cost of production. The present invention solves the foregoing and other problems without resort to the use of alloy steels or other relatively expensive materials. It at the same time permits the provision of a tooth which is so shaped as to meet satisfactorily the requirements for a commercial harrow tooth.

In view of the foregoing and other considerations, the invention contemplates the provision of a tooth the radius of curvature of the body portion of which increases regularly, preferably by regularly decreasing amounts.

In accordance with the invention there may be provided a tooth consisting of a shaped strip of spring-steel having at one end a heel which may be utilized in mounting the tooth on a tooth-carrying bar, and which forms a part of a suitably shaped "heel portion". At a point which is sufficiently near the heel so that the heavier bending stresses will not be applied thereat, the heel portion merges into a "body portion" which conforms to a curve having a regularly increasing radius of curvature and which extends outwardly through a suitable angle and merges into a suitably shaped "point portion" at a point sufficiently near the free end of the tooth so that the heavier bending stresses will not be applied thereto. The free end of the point portion is preferably pointed, but is not necessarily so, and the formation of the tooth adjacent to this free end may, of course, be of any suitable type.

The tooth exemplified in Fig. 1 consists of a heel portion 10 comprising an angular heel 11, a body portion 12, and a point portion 13. The angular heel 11 is mounted on a tooth-carrying angle-bar 14 by means of a clamp 15 and bolt 16. The angle-bar 14 may be suitably mounted, as, for example, by means of rotatable bearing members 17 and 18 for rotation in bearing openings in brackets 19 which are attached to the side bars 21 of a harrow, such as shown in Fig. 2, comprising a tractive element 22, a drawbar 23, and a lever 24 together with suitably connected mechanism for rotating the tooth-carrying bar or bars.

A harrow of this general type forms the subject matter of my co-pending application, Ser. No. 272,585, filed April 25, 1928.

In the particular tooth exemplified in Fig. 1 the inner surface of the body portion 12 conforms to a curve which intersects at points equidistant from each other the circumferences of the series of concentric circles having constantly increasing radii, the distances between circumferences of adjacent circles and the distances between the points of intersection being, in the present instance, in the proportion of nine to thirty-two. The manner in which such a curve may be plotted is clearly indicated in Fig. 1, where the centre of the concentric circles is shown at a point 25, two and thirteen-sixteenths inches from the point 26, at which the tooth leaves the tooth-carrying bar 14, and about one and one-half inches both above and to the rear of the axis of rotation 27 of the bar 14. In the present instance the point 25 is fixed by measuring from the axis 27, through which the bisector of the angle of the heel 11 and the bar 14 passes, an inch and a half along this bisector and then measuring from the point thus plotted an inch and a half in a direction perpendicular to the bisector and rearwardly thereof. A circle having its centre at 25 is drawn thru the point 26, and upon this circle there are built a series of concentric circles, the radius of each of which is nine-sixteenths of an inch greater than the radius of the next smaller circle. From the point 26 a distance of two inches is measured to a point 28 on the next larger circle of the series, and from the point 28 a distance of two inches is measured to a point 29 on the next larger circle, etc., as will be seen clearly from the drawing; and the curve to which the inner surface of the body portion of the tooth conforms is drawn through these points.

In Fig. 3 there is exemplified a tooth which is smaller than the tooth exemplified in Fig. 1 and is of a somewhat different shape. This tooth comprises an angular heel 30, a heel portion 31, a resilient body portion 32, and a point portion 33. As in the case of the tooth exemplified in Fig. 1 an angular tooth-carrying bar is used, the heel 30 of the present tooth being exemplified as mounted on an angle-bar 34 by means of a clamp 35 and bolt 36.

The curve to which the body portion of this tooth conforms, while plotted according to the same general principles as the curve in Fig. 1, is somewhat different therefrom by reason of variation in the relation of measurements used. The general character of the tooth, and particularly its size, is also altered by the utilization of a part of this complete curve, which part is somewhat nearer the center of the curve than is the part of the curve of Fig. 1 which was utilized in connection with the tooth shown in that figure. In order that there may be a better understanding of the manner of producing a curve such as shown in Fig. 3, a portion of the complete curve extending through either end of the body portion of the tooth is shown in this figure. In producing this curve a circle having a radius of one and eleven-sixteenths inches is drawn and a series of concentric circles the radii of which increase constantly by one-half an inch are plotted. From a point 37 on the first of these circles, a distance of two and one-eighths inches is measured to a point 38 on the second of the circles, and from this point a distance of two and one-eighth inches is measured to a point 39 on the third of the circles, and a distance of two and one-eighth inches is measured from the latter point to a point 40 on the fourth of the circles, etc. A portion of the curve corresponding to the size of the desired tooth is then selected and the curve arranged so that the inner end of that portion of the complete curve to be utilized is tangent to the forward side of the angle at the inner side of the heel portion of the tooth at a point such as 41, whereat the tooth leaves the tooth-carrying bar. It is to be noted that by this method of laying out the curve of a tooth, the entire tooth from a point such as 41 to a point near the outer end of the tooth, can be made to conform closely to the desired curve. As is the case in Fig. 1, the present tooth is constructed so that the inner surface thereof corresponds to the curve in question.

There is exemplified in Fig. 4 a tooth the body portion of which has a different shape from either of the preceding teeth, and which is adapted to be mounted in a different manner. The outer surface of the body portion 43 of this tooth corresponds in shape to a curve intersecting at equidistant points three linear units (such as half-inches) apart, the circumferences of a series of concentric circles having radii which increases constantly by one linear unit (such as a half-inch); the series being built on a circle having a radius of four linear units (for example, two inches).

The body portion 43 of the tooth merges, toward its outer end, into a point portion 44, and, toward its inner end, into a heel portion 45 which comprises a heel 46 formed in the shape of a goose-neck so that the same may be fastened upon a tubular bar, such as the pipe 47, in some suitable manner as by a bolt 48 and a clamp 49.

In certain instances, moreover, there may be utilized curves which are plotted through equidistant points on concentric circles, the radii of which increase regularly, although not constantly. There is exemplified in Fig. 5 a tooth the inner surface of the body portion of which conforms to one such curve. In plotting the exemplified curve a point 50 is taken as the center of a series of concentric circles the innermost of which has a radius of twenty linear units (sixteenths of an inch, if there is to be produced a tooth of the usual commercial size, the radius being in this case one and a quarter inches). The succeeding circle has a radius thirty-nine (twenty plus nineteen) linear units, the third circle a radius of fifty-seven (thirty-nine plus eighteen) linear units, etc. so that the increase in radius of each of the circles over the next smaller circle will be one linear unit less than the increase in radius of the latter circle over the circle within it. In other words, the radii of the concentric circles increase regularly by distances which are one linear unit less at each progression outwardly from the center. A curve intersecting successive circles of this series at equidistant points fifty-six linear units (in the present instance) from each other is then plotted. The inner surface of the body portion 51 of the exemplified tooth conforms to a portion of this curve extending from a point between the second and third circles to a point beyond a twelfth circle. At the inner end of the tooth there is provided an angular heel 52 and at the outer end there is provided a point portion 53. The heel 52 is mounted on a tooth-carrying angle-bar 53' by means of a clamp 54 and bolt 55.

It will be seen that in a tooth such as those exemplified, not only are all the irregular changes in curvature throughout the body portion thereof eliminated, but also the sharpest portion of the curve is toward the heel of the tooth, the distance between the heel and the point (i. e. the free, working end) is between one-third and one-fifth the extended length thereof, and the distance between the center of the concentric circles and the point at which the heel leaves the tooth-carrying bar is less than one-twelfth the extended length of the tooth; thereby giving considerably increased strength, resiliency, and ground clearance, without any material increase in the amount of steel used. This is particularly true of the preferred form of tooth shown in Fig. 1 which has been shown by tests to possess a greatly improved strength and resiliency. Such teeth are particularly adapted for use in harrows of the "quack-grass" type, and materially increase the effectiveness thereof.

It is to be understood that, while certain particular embodiments of the invention have been exemplified, the invention in its broader aspects contemplates the provision of teeth the curvature of the body portion of which conforms in shape to a curve plotted in accordance to laws different from those used in plotting the exemplified curves, but having a regularly increasing radius of curvature. For example, there may be provided a tooth the body portion of which conforms in shape to a portion of an Archimedean spiral plotted to intersect the circumferences of concentric circles, the radii of which increase constantly by approximately eleven-sixteenths of an inch, at points on the sides of successive 22½° angles the vertex of which is at the center of said circles.

It will be appreciated from the foregoing that the invention contemplates the production of spring teeth which may be of any desired size, and which may be formed in any of a number of shapes which will all possess to a greater or less degree the outstanding advantages possessed by the exemplified and similar teeth.

It is also to be understood that a tooth so designed that either the inner or outer surface of the body portions thereof conforms to a particular curve, or one in which some line intermediate the two surfaces throughout its length conforms with such curve, will satisfy the invention in its broader aspects; and further that, since the usual method of forming harrow teeth precludes the production of teeth the shape of which is in absolute mathematical conformity to a given curve, and since the advantages of the invention are obtained even when the curve of the tooth varies slightly (from a mathematical standpoint) from a geometrically correct curve, the term "conform", as used herein, should be taken to indicate a substantial rather than a mathematically correct conformity. It is to be understood further that the term "regular", as used herein in reference to variations, is intended to cover both a constant increment (either positive or negative) and an increment which varies linearly.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. A spring tooth for harrows and the like, comprising a heel portion, a point portion, and a resilient body portion extending between the two and conforming in shape to a smooth curve having a regularly increasing radius of curvature.

2. A spring tooth for harrows and the like, comprising a heel portion, a point portion, and a resilient body portion extending between the two and conforming in shape to a smooth curve having a regularly increasing radius of curvature, the distance between the heel and the point of said tooth being less than one-third the extended length of the tooth.

3. A spring tooth for harrows and the like, comprising a heel portion, a point portion, and a resilient body portion extending between the two and conforming in shape to a smooth curve, the radius of curvature of which increases by regularly decreasing amounts.

4. A spring tooth for harrows and the like, comprising a heel portion, a point portion, and a resilient body portion extending between the two and conforming in shape to a smooth curve, the radius of curvature of which increases by regularly decreasing amounts, the distance between the heel and the point of said tooth being between two-sevenths and one-fifth the extended length of the tooth.

5. A spring tooth for harrows and the like, comprising a heel portion, a point portion, and a resilient body portion extending between the two and conforming in shape to a smooth curve having a regularly increasing radius of curvature and extending through an angle of approximately 270°.

6. A spring tooth for harrows and the like, comprising a heel portion, a point portion, and a resilient body portion extending between the two and conforming in shape to a smooth curve intersecting at regularly spaced points the circumferences of a series of concentric circles of regularly increasing radii.

7. A spring tooth for harrows and the like, comprising a heel portion, a point portion, and a resilient body portion extending between the two and conforming in shape to a smooth curve intersecting at equidistant points the circumferences of a series of concentric circles of regularly increasing radii.

8. A spring tooth for harrows and the like, comprising a heel portion, a point portion, and a resilient body portion extending between the two and conforming in shape to a smooth curve intersecting at equidistant points the circumferences of a series of concentric circles of constantly increasing radii.

9. A spring tooth for harrows and the like, comprising a heel portion, a point portion, and a resilient body portion extending between the two and conforming in shape to a smooth curve intersecting at equidistant points, each pair of which is from approximately five to approximately ten linear units apart, the circumferences of a series of concentric circles the radii of which increase constantly by approximately two linear units.

10. A spring tooth for harrows and the like, comprising a heel portion, a point portion, and a resilient body portion extending between the two and conforming in shape to a smooth curve intersecting at equidistant points approximately thirty-two linear units from each other the circumferences of a series of concentric circles the radii of which increase constantly by approximately nine linear units.

11. A spring tooth for harrows and the like comprising a heel portion, a point portion, and a resilient body portion extending between the two, the inner surface of said body portion conforming in shape to a smooth curve intersecting at equidistant points the circumferences of a series of concentric circles of constantly increasing radii.

12. A spring tooth for harrows and the like, comprising a heel portion, a point portion, and a resilient body portion extending between the two and conforming in shape to a smooth curve intersecting at equidistant points approximately two inches apart the circumferences of a series of concentric circles the radii of which increase by approximately nine-sixteenths of an inch.

13. A spring tooth for harrows and the like, comprising an angular heel, a heel portion including said angular heel, a point portion, and a resilient body portion extending between the heel portion and the point portion and conforming in shape to a smooth curve intersecting at approximately equidistant points a series of concentric circles having constantly increasing radii, the center of said circles being at a point to the rear of a line bisecting the angle of said heel.

14. A spring tooth for harrows and the like, comprising an angular heel, a heel portion including said angular heel, a point portion, and a resilient body portion extending between the heel portion and the point portion and conforming in shape to a smooth curve intersecting at approximately equidistant points a series of concentric circles having constantly increasing radii, the center of said circles being at a point above and to the rear of said angular heel.

15. A spring tooth for harrows and the like, comprising a heel portion including a heel whereby the tooth may be mounted on a tooth-carrying bar, a point portion, and a resilient body portion extending between the point portion and the body portion and conforming in shape to a smooth curve intersecting at approximately equidistant points a series of concentric circles having regularly increasing radii, the center of said circles being at a point substantially above and to the rear of said heel.

16. In a harrow or the like, the combination with a tooth-carrying bar, of a spring tooth comprising a heel portion formed to provide a heel whereby the tooth may be mounted on said bar, a point portion, and a resilient body portion extending between the heel portion and the point portion, and conforming in shape to a smooth curve intersecting at equidistant points, approximately thirty-two linear units from each other the circumferences of a series of concentric circles the radii of which increase constantly by approximately nine linear units, the center of said circles being at a point approximately forty-five linear units from the point where said tooth leaves said bar.

17. A spring tooth for harrows and the like, comprising a heel portion adapted to be rotatably mounted, a point portion, and a resilient body portion extending between the heel portion and the point portion and conforming in shape to a smooth curve intersecting at equidistant points approximately thirty-two linear units apart the circumferences of a series of concentric circles the radii of which increase by approximately nine linear units, the center of said concentric circles being at a point approximately twenty-four linear units both above and to the rear of the axis of rotation of said tooth.

18. In a harrow or the like, the combination with a tooth-carrying bar, of a spring tooth comprising a heel mounted on said bar and a point portion adjacent the free end of the tooth, the inner surface of said tooth from the point where the tooth leaves the bar to a point adjacent said point portion conforming in shape to a smooth curve intersecting at equidistant points the circumferences of a series of concentric circles of constantly increasing radii.

19. In a harrow or the like, the combination with a tooth-carrying bar, of a spring tooth comprising a heel portion formed to provide a heel whereby the tooth may be mounted on said bar, a point portion, and a resilient body portion extending between the heel portion and the point portion and conforming in shape to a smooth curve intersecting at regularly spaced points the circumferences of a series of concentric circles of regularly increasing radii, the distance between the center of said circles and the point at which the tooth leaves said bar being less than one-twelfth of the extended length of the tooth.

20. A spring tooth for harrows and the like, comprising a heel portion, a point portion, and a resilient body portion extending between the two and conforming in shape to a curve intersecting at equidistant points approximately three linear units from each other the circumferences of a series of concentric circles the radii of which increase constantly by approximately one linear unit.

21. A spring tooth for harrows and the like, comprising a heel portion, a point portion, and a resilient body portion extending between the two, the outer surface of said body portion conforming in shape to a curve intersecting at equidistant points approximately three linear units from each other the circumferences of a series of concentric circles the radii of which increase constantly by approximately one linear unit.

22. A spring tooth for harrows and the like, comprising a heel in the shape of a goose-neck, a heel portion including said heel, a point portion, and a resilient body portion extending between the heel portion and the point portion and conforming in shape to a curve intersecting at approximately equidistant points a series of concentric circles having constantly increasing radii, the center of said circles being at a point above said gooseneck shaped heel.

23. A spring tooth for harrows and the like, comprising a heel portion, a point portion, and a resilient body portion extending between the two and conforming in shape to a curve intersecting at equidistant points the circumference of a series of concentric circles, the radii of which increase regularly by regularly decreasing amounts.

24. A spring tooth for harrows and the like, comprising a heel portion, a point portion, and a resilient body portion extending between the two and conforming in shape to a curve intersecting at equidistant points the circumferences of a series of concentric circles, the radii of which increase regularly by constantly decreasing amounts.

25. A spring tooth for harrows and the like, comprising a heel portion, a point portion, and a resilient body portion extending between the two and conforming in shape to a curve intersecting at equidistant points approximately fifty-six linear units from each other the circumferences of a series of concentric circles the radii of which increase regularly by amounts which decrease constantly by one linear unit.

26. A spring tooth for harrows and the like, comprising a heel portion, a point portion, and a resilient body portion extending between the two and conforming in shape to a curve intersecting at equidistant points approximately fifty-six linear units from each other the circumferences of a series of concentric circles the radii of which increase regularly by amounts which decrease constantly by one linear unit, said body portion extending through an angle of more than 180°.

27. A spring tooth for harrows and the like, comprising a heel portion, a point portion, and a resilient body portion extending between the two and conforming in shape to a portion of a curve intersecting at equidistant points approximately fifty-six linear units apart the circumferences of a series of concentric circles the smallest of which has a radius of twenty linear units, the radii of said circles increasing regularly by amounts which decrease constantly by one linear unit.

28. A spring tooth for harrows and the like, comprising a heel portion, a point portion, and a resilient body portion extending between the two and conforming in shape to a portion of a curve intersecting at equidistant points approximately fifty-six linear units apart the circumferences of a series of concentric circles the smallest of which has a radius of twenty linear units, the radii of said circles increasing regularly by amounts which decrease constantly by one linear unit, said point portion being on the outside of a line tangent to the initial part of the body portion.

In testimony whereof I affix my signature.

ARTHUR W. REYNOLDS.